W. A. GIBBS.
SUPPORT FOR TRAPS.
APPLICATION FILED SEPT. 24, 1919.

1,375,286.

Patented Apr. 19, 1921.
2 SHEETS—SHEET 1.

W. A. GIBBS.
SUPPORT FOR TRAPS.
APPLICATION FILED SEPT. 24, 1919.

1,375,286.

Patented Apr. 19, 1921.
2 SHEETS—SHEET 2.

WITNESSES
J. Herbert Bradley.

INVENTOR
Walter A. Gibbs
by Dannis S. Wolcott
Atty

UNITED STATES PATENT OFFICE.

WALTER A. GIBBS, OF WILMINGTON, DELAWARE.

SUPPORT FOR TRAPS.

1,375,286.  Specification of Letters Patent.  Patented Apr. 19, 1921.

Application filed September 24, 1919. Serial No. 326,055.

*To all whom it may concern:*

Be it known that I, WALTER A. GIBBS, residing at Wilmington, in the county of New Castle and State of Delaware, a citizen of the United States, have invented or discovered certain new and useful Improvements in Supports for Traps, of which improvements the following is a specification.

In order to catch hawks or birds which commit destructive depredation it is the practice to secure traps on poles or other exposed elevated supports. It has been found, however, that when caught by one or both legs or a wing, that the bird in its struggles can free itself from a stationary or fixed trap. The object of the invention described herein is to so support a trap that it cannot be displaced by wind or other accidental causes but will freely move with the bird in its struggles, and hence the latter cannot tear itself free. It is a further object of the invention to provide means to prevent the trap being sprung by small birds which are not harmful and are protected by law. The invention is hereinafter more fully described and claimed.

Figure 1:
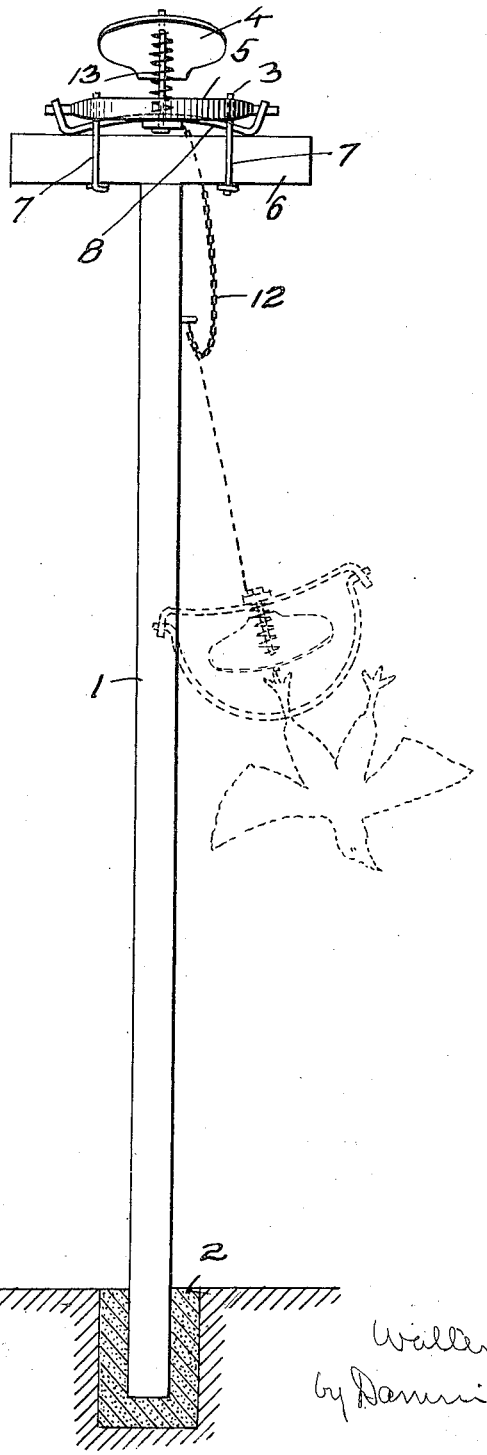
Figure 2:
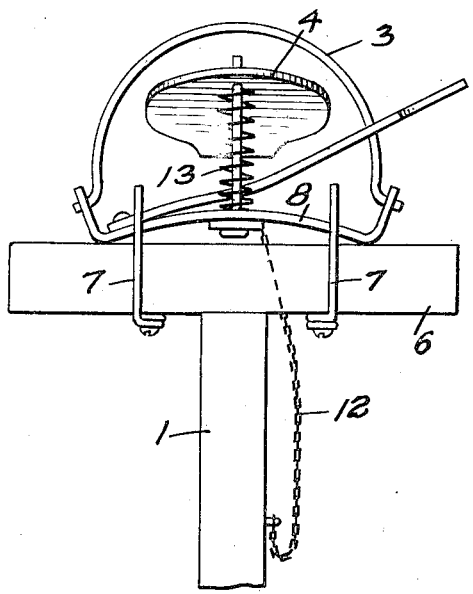
Figure 3:
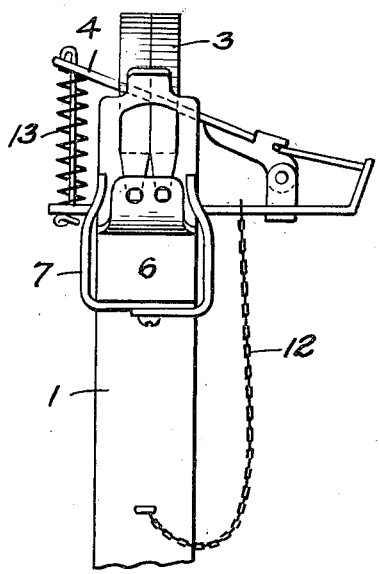
Figure 4:
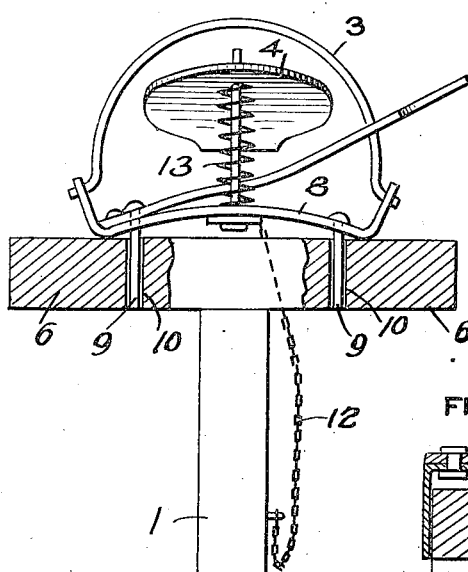
Figure 5:
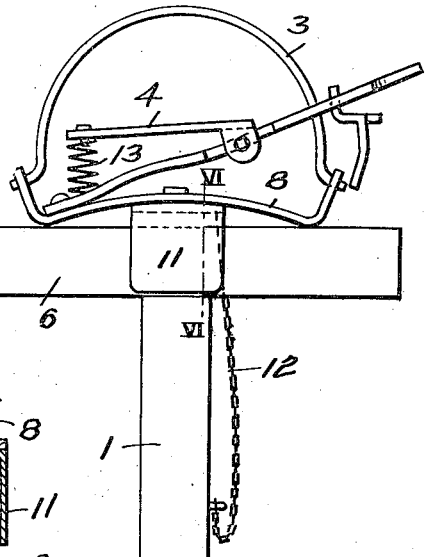

In the accompanying drawings forming a part of this specification, Figure 1 shows my improved trap support in elevation; Fig. 2 is an elevation on an enlarged scale showing one manner of connecting the trap to an elevated support; Fig. 3 is an elevation at right angles to that shown in Fig. 2; Fig. 4 is a view partly in elevation and partly in section illustrating a modification of the construction shown in Figs. 2 and 3; Fig. 5 is an elevation of a third embodiment of the improvement, and Fig. 6 is a sectional view on a plane indicated by the line VI—VI, Fig. 5.

In its broadest aspect, the invention consists in providing a support for a trap of suitable or known construction and means whereby the trap can be so attached to the support that it will not be accidentally dislodged from operative position as by a high wind, but can be dislodged by the struggles of the bird caught in the trap.

In adapting the improvement to practical use, a pole 1 is arranged vertically, preferably by inserting its lowered end in a socket 2 embedded in the ground to a suitable depth. This construction permits of the easy lowering of a pole to remove a bird from the trap and to reset the latter. Suitable means are provided whereby a trap 3 may be supported by the pole in such position that when the bird alights on the pole, its foot will shift the treadle 4 and thereby release the jaws 5 so that they can be closed by the operating spring. The connection between the pole and the trap should be such that the trap will not be accidentally dislodged, but can be dislodged from normal position on the pole by the struggles of the bird.

As will be readily seen or understood by those skilled in the art, such a separable connection can be constructed in a variety of ways and hence the broader claims should not be construed as limited to a specific construction.

In the construction shown in Figs. 1, 2 and 3, a perch or block 6 is secured on the end of the pole and resilient fingers 7 are so secured in pairs to the block or perch that their free ends will project above the block and yieldingly grip the edges of the base bar 8 of the trap.

In the construction shown in Fig. 4 the base bar of the trap is provided with pins 9 adapted to fit loosely in holes 10 in the perch or block, while in the construction shown in Figs. 5 and 6, a U-shaped clip 11 is secured in an inverted position on the base bar so that when the trap is placed in position, the perch or block will be yieldingly gripped by the fingers of the clip.

As some birds may be sufficiently powerful to carry the trap when lifted from the perch, an additional connection between the trap and pole is provided in the form of a cord or light chain 12, the length of the chain being sufficient to permit of the trap being lifted from the upper end of the pole.

As the trigger mechanism employed for holding the jaws in open position is constructed so as to release the jaws on a light touch of a member of a bird, or animal, on the treadle, provision is made to prevent the treadle's being moved by small birds. To this end a light spring 13 is so arranged under the treadle as to prevent a releasing movement of the treadle unless subjected to a weight greater than that of what is termed song birds, etc.

I claim herein as my invention:

1. The combination of a post, a trap and means for locking the trap to the post, said means being releasable by an initial vertical movement of the trap from the post.

2. The combination of a post, a trap, and fingers secured to one of said parts and adapted to so engage the other part that the trap is releasable only by an initial vertical movement from the post.

3. The combination of a post, a trap, and resilient fingers secured to one of the parts and adapted to so engage the other part that the trap is releasable only by an initial vertical movement from the post.

In testimony whereof, I have hereunto set my hand.

WALTER A. GIBBS.